US012737032B2

(12) United States Patent
Phan et al.

(10) Patent No.: US 12,737,032 B2
(45) Date of Patent: Sep. 15, 2026

(54) STORING CONTIGUOUS DISPLAY CONTENT IN EACH DRAM FOR IDLE STATIC SCREEN POWER SAVING

(71) Applicants: Advanced Micro Devices, Inc., Santa Clara, CA (US); ATI Technologies ULC, Markham (CA)

(72) Inventors: Gia Tung Phan, Markham (CA); Ashish Jain, Austin, TX (US); Anthony Asaro, Markham (CA); Dennis Kin-Wah Au, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 80 days.

(21) Appl. No.: 18/128,744

(22) Filed: Mar. 30, 2023

(65) Prior Publication Data

US 2024/0329720 A1 Oct. 3, 2024

(51) Int. Cl.

*G06F 1/3234* (2019.01)
*G09G 5/00* (2006.01)
*G09G 5/36* (2006.01)

(52) U.S. Cl.

CPC ........... *G06F 1/3265* (2013.01); *G09G 5/001* (2013.01); *G09G 5/363* (2013.01); (Continued)

(58) Field of Classification Search

CPC ........... G06F 1/3265; G06F 2212/1028; G06F 2212/502; G06F 1/3287; G06F 12/0607; G06F 1/3275; G09G 5/001; G09G 5/363; G09G 2300/0842; G09G 2330/021; G09G 2360/123; G09G 2360/18

See application file for complete search history.

(56) References Cited

U.S. PATENT DOCUMENTS 6,260,151 B1 * 7/2001 Omizo ................. G06F 1/3296 713/340
7,590,815 B1 9/2009 de Waal
(Continued)

OTHER PUBLICATIONS

International Search Report and Written Opinion for International Application No. PCT/US2024/022305, mailed Jul. 2, 2024, 11 pp.
(Continued)

*Primary Examiner* — Jaweed A Abbaszadeh
(74) *Attorney, Agent, or Firm* — Kowert, Hood, Munyon, Rankin & Goetzel, P.C.; Rory D. Rankin

(57) ABSTRACT

An apparatus and method for efficiently managing power consumption among multiple, replicated functional blocks of an integrated circuit. An integrated circuit includes multiple, replicated memories that use separate power domains. Data of a given type is stored in an interleaved manner among the multiple memories. When control circuitry detects an idle state, commands are sent to the multiple memories specifying storing data of the given type in a contiguous manner in the memories connected to multiple functional blocks. Subsequently, the control circuitry transitions all but one of the memories to the sleep state. The memories rotate amongst themselves with a single memory being in the active state and servicing requests based on which data of the given type is targeted by the requests.

20 Claims, 8 Drawing Sheets

(52) U.S. Cl.
CPC ............... *G09G 2300/0842* (2013.01); *G09G 2330/021* (2013.01); *G09G 2360/123* (2013.01); *G09G 2360/18* (2013.01)

(56) References Cited

U.S. PATENT DOCUMENTS 8,949,554 B2 2/2015 Sadowski et al.
9,032,234 B2 * 5/2015 Zaarur .................. G06F 1/3225 713/320
2007/0005998 A1 * 1/2007 Jain ....................... G06F 1/3275 713/300
2008/0005516 A1 * 1/2008 Meinschein .......... G06F 1/3275 711/E12.006
2009/0235105 A1 9/2009 Branover et al.
2009/0300299 A1 12/2009 Saxe et al.
2010/0058078 A1 3/2010 Branover et al.
2010/0287394 A1 11/2010 Branover et al.
2011/0078478 A1 3/2011 Branover et al.
2011/0145609 A1 * 6/2011 Berard .................. G06F 1/3275 711/147
2011/0252180 A1 * 10/2011 Hendry ................. G06F 3/0647 711/3
2011/0320751 A1 12/2011 Wang et al.
2013/0073886 A1 * 3/2013 Zaarur ................ G06F 12/0223 713/320
2013/0120402 A1 * 5/2013 Adams ...................... G06F 8/38 345/473
2015/0301836 A1 10/2015 Chung et al.

OTHER PUBLICATIONS

"2nd Generation Intel Core Processor Family Desktop, Intel Pentium Processor Family Desktop, and Intel Celeron Processor Family Desktop", Datasheet, Document No. 324641-007, Sep. 2012, 112 pages, vol. 1.
International Preliminary Report on Patentability for International Application No. PCT/US2024/022305, mailed Oct. 9, 2025, 8 pp.

* cited by examiner

STORING CONTIGUOUS DISPLAY CONTENT IN EACH DRAM FOR IDLE STATIC SCREEN POWER SAVING

BACKGROUND

Description of the Relevant Art

Both planar transistors (devices) and non-planar transistors are fabricated for use in integrated circuits within semiconductor chips. A variety of choices exist for placing processing circuitry in system packaging to integrate multiple types of integrated circuits. Some examples are a system-on-a-chip (SOC), multi-chip modules (MCMs) and a system-in-package (SiP). Mobile devices, desktop systems, and servers use these packages. Regardless of the choice for system packaging, in several uses, power consumption of modern integrated circuits has become an increasing design issue with each generation of semiconductor chips.

As power consumption increases, more costly cooling systems such as larger fans and heat sinks are utilized to remove excess heat and prevent failure of the integrated circuit. However, cooling systems increase system costs. The power dissipation constraint of the integrated circuit is not only an issue for portable computers and mobile communication devices, but also for high-performance desktop computers and server computers. Power management circuitry assigns operating parameters to different partitions of an integrated circuit. The operating parameters include at least an operating power supply voltage and an operating clock frequency.

Although a partition can have no computational tasks to perform during a particular time period while an application is running, the power management circuitry is unable to assign a sleep state to the partition due to occasional maintenance tasks targeting the partition. Recent integrated circuits include multiple replicated functional blocks in the partition to increase throughput. Each functional block includes one or more sub-blocks for data processing, one or more levels of cache, and an interface to communicate with local memory. In one example, when a video graphics application is executed by the integrated circuit, a partition that includes multiple functional blocks responsible for rendering video frame data has no further computational tasks to perform when the image presented on a display device has no updates. The image remains unchanged during a pause of the application, during a wait time for user input information, or other condition that doesn't require updates to the image despite the application is still running. However, the power management circuitry is unable to assign a sleep state to the multiple functional blocks due to periodic refresh operations that request data to be retrieved from the multiple functional blocks and sent to the display device.

In view of the above, methods and mechanisms for efficiently managing power consumption of multiple, replicated functional blocks of an integrated circuit are desired.

Figure 1:
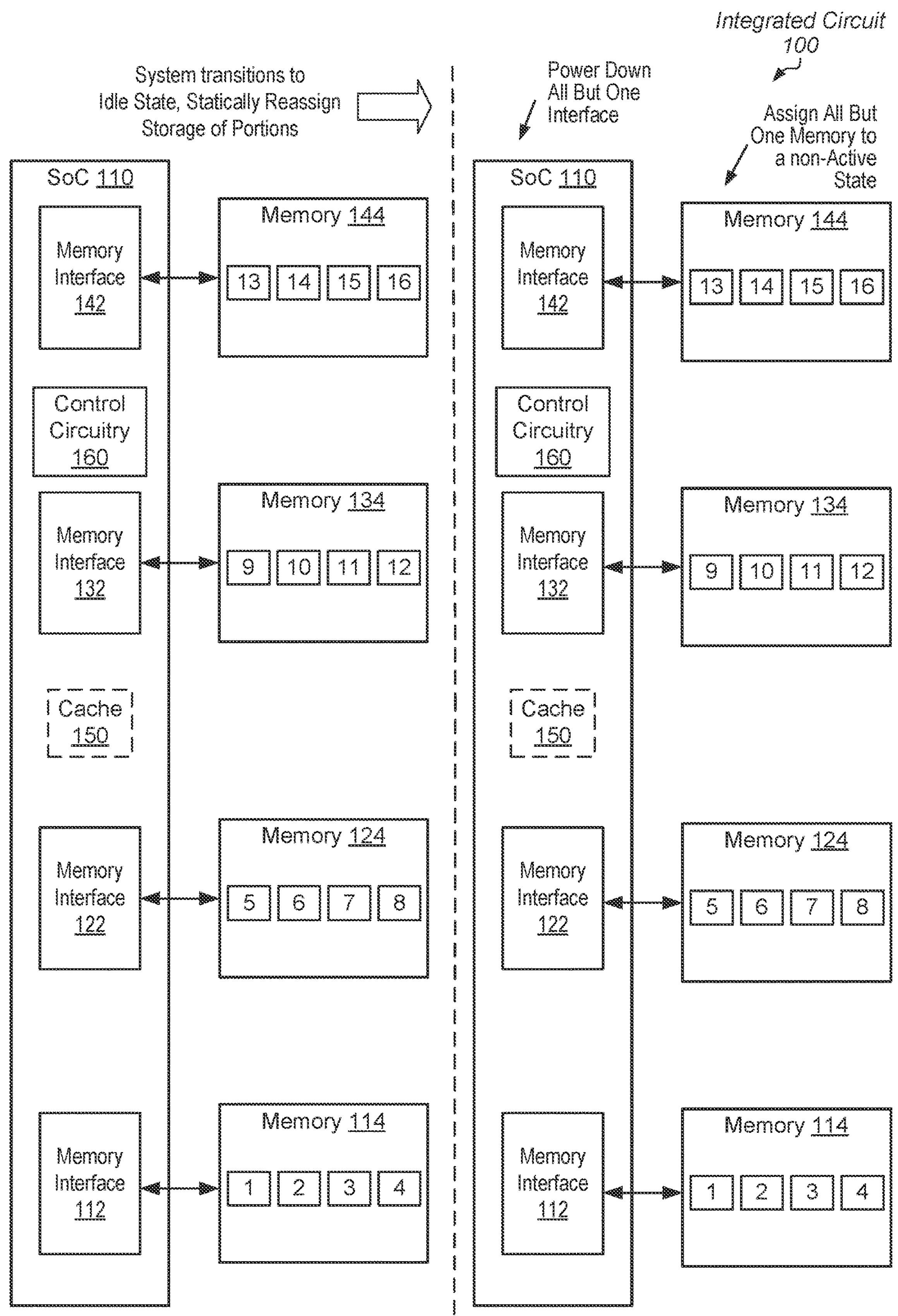
FIG. 1 is a generalized block diagram of an integrated circuit that manages power consumption among replicated memories.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing power consumption among multiple, replicated memories of an integrated circuit are contemplated. In various implementations, an integrated circuit includes multiple, replicated memories that use separate power domains. The multiple memories store data of a given type in an interleaved manner among the multiple memories. In an implementation, the data of the given type is video frame data of a frame buffer that has been rendered by the multiple functional blocks of the integrated circuit. A system idle state indicates a static screen of the display device connected to the display controller, and the only memory accesses being performed are memory accesses to refresh the content being displayed on the display device. When control circuitry detects the system idle state, the control circuitry sends commands to the multiple memories specifying storing data of the given type in a contiguous manner in the memories connected to the multiple functional blocks. Subsequently, the control circuitry transitions one or more memories to a sleep state. In an implementation, the control circuitry transitions all but one of the memories to the sleep state.

In an implementation, the sleep state is a component idle state with the lowest available voltage magnitude of any of one or more component idle states. The corresponding memory in the sleep state has power consumption reduced, but this memory also retains sufficient configuration information (or context information) to return to the active state without restarting the operating system. In another implementation, the sleep state is a component idle state with a voltage magnitude lower than a voltage magnitude provided by the active state, but higher than the lowest available voltage magnitude of any of one or more component idle states. In some implementations, in the sleep state, the control circuitry additionally turns off the power supply reference level to a corresponding memory interface used by this memory. For example, the control circuitry sends control signals to power switches that disconnect, from a physical voltage plane, the power supply reference level used by the corresponding memory interface. The functional blocks process requests targeting the data of the given type using a particular memory that is currently in an active state and is being targeted by the requests.

Turning now to FIG. 1, a generalized block diagram is shown of an integrated circuit 100 that manages power consumption among multiple memories. In the illustrated implementation, the integrated circuit 100 includes the system-on-chip (SoC) 110 that includes multiple memory interfaces 112, 122, 132 and 142 that connect to multiple memories 114, 124, 134 and 144. In addition, in some implementations, the SoC 110 includes a cache 150, whereas, in other implementations, no cache is provided. In various implementations, each of the memories 114, 124, 134 and 144 is one of a variety of types of dynamic random-access memory (DRAM). Although not shown for ease of illustration, the SoC 110 includes one or more functional blocks and sub-blocks that provide a variety of functionalities and generate memory access requests targeting content stored in the memories 114, 124, 134 and 144. As used herein, a "functional block" is also referred to as or an "intellectual property block" (or IP block). One or more of the functional blocks are also capable of generating requests that target another one of the functional blocks and capable of servicing requests from another functional block.

One or more functional blocks are fabricated on a larger semiconductor die such as the system-on-chip (SoC) 110. Examples of the functional blocks are a central processing unit (CPU), an application specific integrated circuit (ASIC), a field programmable gate array (FPGA), a multimedia engine, and a processing unit with a highly parallel microarchitecture such as a graphics processing unit (GPU) and a digital signa processor (DSP). It is also possible and contemplated that the SoC 110 can also include one or more of a variety of other types of functional blocks. Due to limited on-die area of the SoC 110, the size of the cache 150 of the SoC 110 is limited whether the SoC includes a single functional block or multiple functional blocks. Therefore, in one implementation, the integrated circuit 100 includes a microprocessor with a limited sized cache, such as cache 150, and circuitry that executes instructions of firmware that includes instructions of an algorithm that manages power consumption among the multiple memories 114, 124, 134 and 144.

A variety of computing devices use the integrated circuit 100. Examples of these computing devices are a desktop computer, a laptop computer, a server computer, a tablet computer, a smartphone, a gaming device, a smartwatch, and so on. The following description describes power management of multiple, replicated memories 114, 124, 134 and 144 connected to the SoC 110, but the following description is also applicable to the power management of multiple, replicated memory chiplets placed in a multi-chip module (MCM). In the case of using an MCM, one or more of the memory chiplets are connected to separate power rails, and therefore, can use separate power domains. Similarly, in the case of the integrated circuit 100, one or more of the memories 114, 124, 134 and 144 are connected to separate power rails, and therefore, can use separate power domains.

Each of multiple power domains includes at least operating parameters such as an operating power supply voltage and an operating clock frequency. Each of the power domains also includes control signals for enabling and disabling connections to clock generating circuitry and a power supply reference. In various implementations, each of the memories 114, 124, 134 and 144 utilizes a separate power rail and can be set to a separate power domain. The functional blocks and sub-blocks of the SoC 110 and the memories 114, 124, 134 and 144 utilize transistors. As used herein, a "transistor" is also referred to as a "semiconductor device" or a "device." The transistors include p-type metal oxide semiconductor (PMOS) field effect transistors FETS (or pfets) in addition to n-type metal oxide semiconductor (NMOS) FETS (or nfets). In some implementations, the devices (or transistors) in the integrated circuit 100 are planar devices.

In other implementations, the devices (or transistors) in the integrated circuit 100 are non-planar devices. Examples of non-planar transistors are tri-gate transistors, fin field effect transistors (FETs), and gate all around (GAA) transistors. In some implementations, the integrated circuit 100 includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to a central processing unit (CPU) that includes one or more general-purpose processor cores. Alternatively, a 3D IC is stacked directly on top of another IC.

As shown, each of the memories 114, 124, 134 and 144 stores a copy of one or more portions of data of a given type. Each of the memories 114, 124, 134 and 144 is one of a variety of types of dynamic random-access memory (DRAM). In an implementation, the data of the given type is video frame data stored in a frame buffer implemented by the memories 114, 124, 134 and 144. The portions of data of the given type are shown as numbered boxes where the number is used to identify it. In some implementations, each portion of data is a contiguous portion compared to a previous portion of a larger data set (such as a video frame buffer) where the previous portion has a number identifying it that is one less than the number identifying the current portion. For example, portion "2" is a next contiguous portion following portion "1." In an implementation, each portion has a same size such as a size of a page of DRAM or other. In other implementations, one or more portions have a different size.

In the illustrated implementation, the memory 114 stores a copy of the portion "1," the portion "2," the portion "3" and the portion "4." The memory 124 stores a copy of the portion "5," the portion "6," the portion "7" and the portion "8." The memory 134 stores a copy of the portions "9" to "12," and the memory 144 stores a copy of the portions "13" to "16." In an implementation where the SoC 110 utilizes the cache 150, the cache 150 is capable of storing a copy of data that is stored in the memories 114, 124, 134 and 144. However, the cache 150 has a size less than a size of the combination of the portions in any one of the memories 114, 124, 134 and 144. For example, the cache 150 is unable to simultaneously store the portions "1" to "4." Similarly, the cache 150 is unable to store the portions "5" to "8." The floorplan of the SoC 110 cannot provide sufficient on-die area to provide a larger size for the cache 150.

In an implementation, the SoC 110 processes tasks of a video graphics workload such as rendering video frame data for a display device (not shown). The data of the given type is video frame data of a frame buffer that has been rendered and then stored in the memories 114, 124, 134 and 144. This data of the given type is sent from the memories 114, 124, 134 and 144 and through the SoC 110 to a display controller and then to the display device. In some implementations, memories 114, 124, 134 and 144 store the data of the given type in a contiguous manner as shown in the illustrated implementation.

Although storing data in a contiguous manner includes more latency for accesses, this storage arrangement reduces the latency to transition to an idle state for the integrated circuit 100. Typically, data is stored in an interleaved manner in the memories 114, 124, 134 and 144 in order to hide overhead latency (penalty) of the memory devices used to implement the memories 114, 124, 134 and 144. For example, each of the steps of opening a page in DRAM, storing the targeted page in a row buffer, accessing the row buffer, and closing the page includes appreciable latency or penalty. When new data of the given type is retrieved from the DMA engine or other unit, and sent to the memories 114, 124, 134 and 144, the new data of the given type is now stored in a contiguous manner in the memories 114, 124, 134 and 144, rather than in an interleaved manner among the memories 114, 124, 134 and 144.

In an implementation, control circuitry 160 is a part of power management circuitry (not shown) such as a power manager. The control circuitry 160 either determines or assigns an idle state to the integrated circuit 100, or receives an indication of the idle state. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system that utilizes the memories 114, 124, 134 and 144 enters an idle state although the video graphics application has not stopped being executed.

Due to the static allocation that stores data of the given type in the contiguous manner as shown, the control circuitry 160 transitions, to a sleep state, one or more of the memories 114, 124, 134 and 144. In an implementation, the sleep state is a minimum power consumption state without having a power supply turned off. When the memories 114, 124, 134 and 144 utilize DRAM, the memories 114, 124, 134 and 144 are volatile memories. In some implementations, the sleep state is a component idle state with the lowest available voltage magnitude of any of one or more component idle states. A memory of the memories 114, 124, 134 and 144 has power consumption reduced, but this memory also retains sufficient configuration information (or context information) to return to the active state without restarting the operating system.

In another implementation, the sleep state is a component idle state with a voltage magnitude lower than a voltage magnitude provided by the active state, but higher than the lowest available voltage magnitude of any of one or more component idle states. In an implementation, in the sleep state, the control circuitry 160 (or a power manager or other circuitry) additionally turns off the power supply reference level to one or more corresponding memory interfaces of the memory interfaces 112, 122, 132 and 142. For example, the control circuitry 160 (or a power manager or other circuitry) sends control signals to power switches that disconnect, from a physical voltage plane, the power supply reference level used by the one or more corresponding memory interfaces of the memory interfaces 112, 122, 132 and 142. The sleep state and one or more active states can be associated with one or more power-performance states (P-states) that indicate a respective power domain managed by the power management circuitry. The sleep state and one or more active states can be associated with one or more states of the Advanced Configuration and Power Interface (ACPI) standard. States of another standard are also possible and contemplated. The control circuitry 160 does not transition the memory 114 to the sleep state, but maintains the memory 114 in one of multiple active states. In an implementation, the control circuitry 160 transitions each of the memories 124, 134 and 144 to the sleep state.

During the idle state of the video subsystem, the memory 114, which stores data of the given type (portions "1" to "4"), processes any generated requests targeting the data of the given type. For example, despite not requesting new frame data to be rendered, the display device of the computing system still performs refresh operations. In this case, the data of the given type (portions "1" to "4") are a subset of the entire rendered data of the last frame (portions "1" to "16") to be processed before the transition to the idle state indicating a static screen of the display device.

To perform the refresh operations, the display device requests data of the given type (portions "1" to "16") from the memories 114, 124, 134 and 144. After accessing portions "1" to "4" from memory 114, the control circuitry 160 transitions the memory 124 from the sleep state to the active state, and transitions the memory 114 from the active state to the sleep state. Therefore, a single memory is in the active state while the remaining memories are in the sleep state. Similarly, after accessing portions "5" to "8" from memory 124, the control circuitry 160 transitions the memory 134 from the sleep state to the active state, and transitions the memory 124 from the active state to the sleep state.

Further, after accessing portions "9" to "12" from memory 134, the control circuitry 159 transitions the memory 144 from the sleep state to the active state, and transitions the memory 134 from the active state to the sleep state. Continuing, after accessing portions "13" to "16" from memory 144, the control circuitry 160 transitions the memory 114 from the sleep state to the active state, and transitions the memory 144 from the active state to the sleep state. These steps are repeated during the video refresh operations. Therefore, a single memory is in the active state while the remaining memories are in the sleep state. While still supporting the refresh operations, the integrated circuit 100 reduces power consumption by maintaining a single memory of memories 114, 124, 134 and 144 in the active state while the remaining memories of memories 114, 124, 134 and 144 are in the sleep state.

Figure 2:
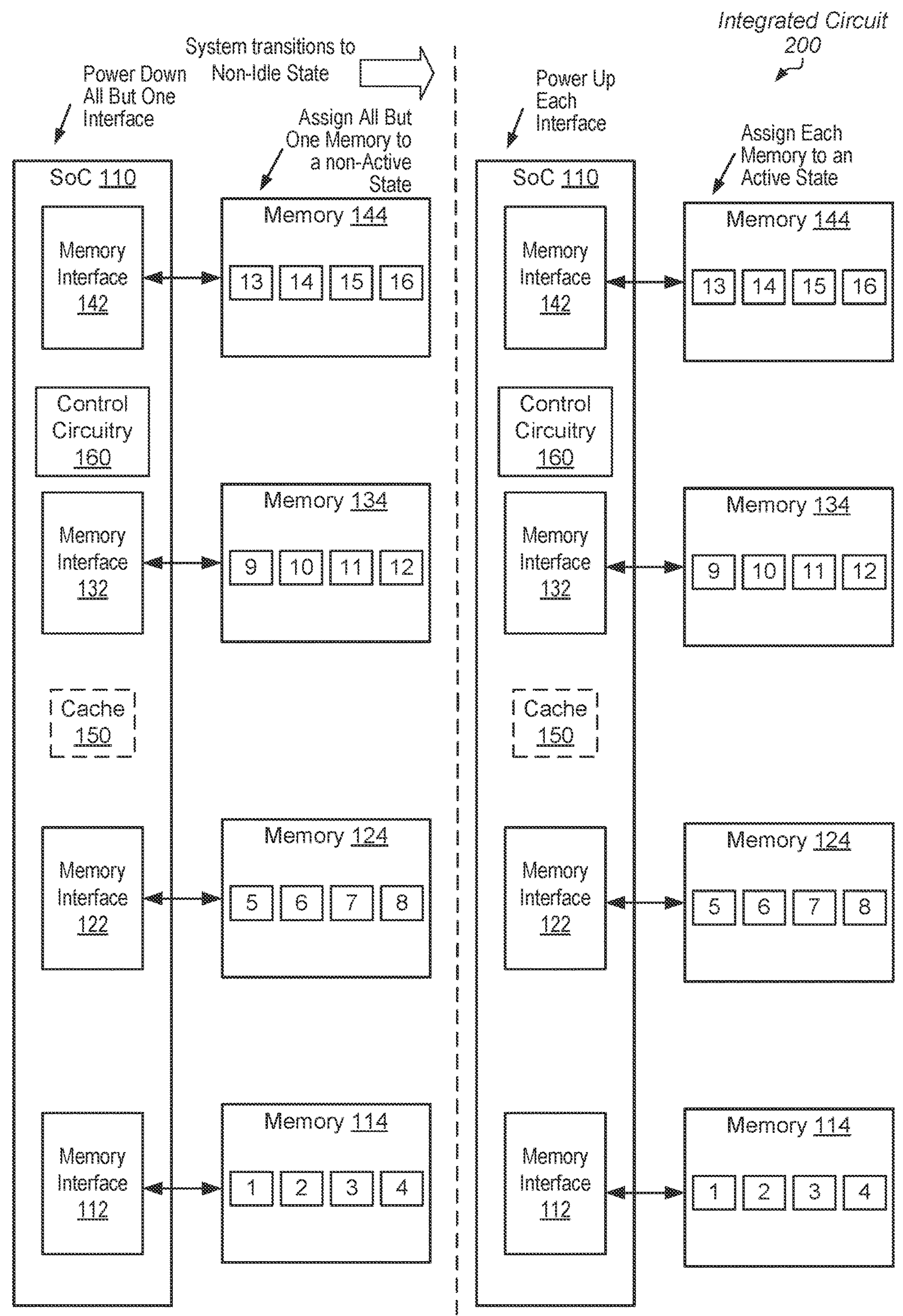
FIG. 2 is a generalized block diagram of an integrated circuit that manages power consumption among replicated memories.

Referring to FIG. 2, a generalized block diagram is shown of an integrated circuit 200 that manages power consumption among replicated memories. Circuits and signals described earlier are numbered identically. Here, each of the memories 114, 124, 134 and 144 store a corresponding copy of the portions "1" to "16" in a contiguous manner as shown earlier. The control circuitry 160 determines the integrated circuit 200 exits an idle state. For example, a video graphics workload ends the idle state indicating a static screen of the display device, and resumes rendering video frame data for the display device. The control circuitry 160 assigns each of the memories 114, 124, 134 and 144 an active state such that no memory of the memories 114, 124, 134 and 144 is still in a sleep state. In addition, the control circuitry 160 ensures no memory interface of the memory interfaces 112, 122, 132 and 142 remains turned off or disconnected from a corresponding power supply reference level. Rather, each of the memory interfaces 112, 122, 132 and 142 is turned on and in an active state. When new data of the given type is retrieved from the DMA engine or other unit, and sent to the integrated circuit 200, the new data of the given type continues to be stored in a contiguous manner in the memories 114, 124, 134 and 144. Therefore, the latency to transition to the idle state again is reduced.

Figure 3:
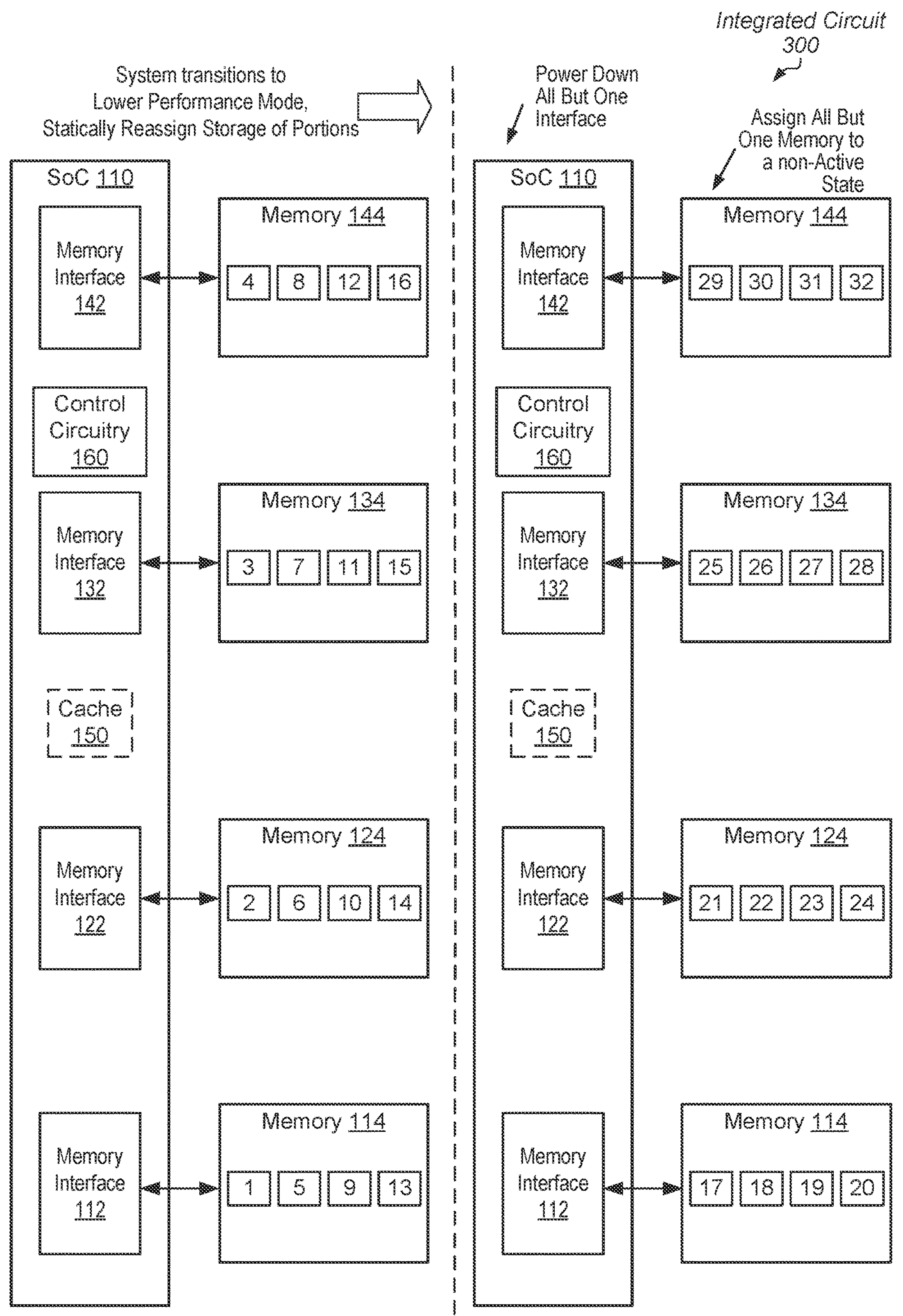
FIG. 3 is a generalized block diagram of an integrated circuit that manages power consumption among replicated memories.

Turning now to FIG. 3, a generalized block diagram is shown of an integrated circuit 300 that manages power consumption among replicated memories. Circuits and signals described earlier are numbered identically. Here, each of the memories 114, 124, 134 and 144, store a corresponding copy of the portions "1" to "16" in an interleaved manner. For example, a first portion of the data of the given type (portion "1") is stored in a first memory (memory 114), and a second portion different (portion "2") from the first portion (portion "1") of the data of the given type is stored in a second memory (memory 124). A third portion (portion "3") different from the first portion and the second portion of the data of the given type is stored in a third memory (memory 134), and so on. When the last memory (memory 144) of the multiple memories has a portion (portion "4") of the data of the given type stored in it, a next portion (portion "5") of the data of the given type is stored in the first memory (memory 114). Data storage of the data of the given type continues in this manner.

The memories 114, 124, 134 and 144 store the portions "1" to "16" in the interleaved manner in order to hide overhead latency (penalty) of the memory devices used to implement the memories 114, 124, 134 and 144. For example, each of the steps of opening a page in DRAM, storing the targeted page in a row buffer, accessing the row buffer, and closing the page includes appreciable latency or penalty. The control circuitry 160 either determines or assigns an idle state to the integrated circuit 300, or receives an indication of the idle state. For example, a video graphics application no longer updates frame data to be viewed on the display device. The control circuitry 160 changes data storage arrangement from storage in an interleaved manner to storage in a contiguous manner. The control circuitry 160 sends commands or indications of this change to one or more of a direct memory access (DMA) engine or circuit, and the memory interfaces 112, 122, 132 and 142.

In an implementation, a next frame that includes the portions "17" to "32" is the last frame that is rendered before the integrated circuit 300 enters the idle state. Due to the changes initiated by the control circuitry 160, the memory interfaces 112, 122, 132 and 142 store these portions in a contiguous manner in the memories 114, 124, 134 and 144. For example, memory 114 stores the portions "17" to "20, the memory 124 stores the portions "21" to "24," and so on. In an implementation, the control circuitry 160 transitions each of the memories 124, 134 and 144 to the sleep state while maintaining the memory 114 in the active state. Additionally, the control circuitry 160 powers down the memory interfaces 122, 132 and 142, or turns off a corresponding power supply reference level to the memory interfaces 122, 132 and 142. The memory interface 112 remains connected to a corresponding power supply reference level, and remains operable in an active state along with the memory 114.

To perform the refresh operations, the display device requests data of the given type (portions "17" to "32") from the memories 114, 124, 134 and 144. After accessing portions "17" to "20" from memory 114 to send these portions to the display device, the control circuitry 160 transitions the memory 124 from the sleep state to the active state, and transitions the memory 114 from the active state to the sleep state. Additionally, the control circuitry 160 powers up the memory interface 122, and powers down the memory interface 112. For example, the control circuitry 160 reconnects a corresponding power supply reference level to the memory interface 122, and disconnects a corresponding power supply reference level from the memory interface 112. Therefore, in some implementations, a single memory is in the active state while the remaining memories are in the sleep state. Similarly, after accessing portions "21" to "24" from memory 124, the control circuitry 160 transitions the memory 134 from the sleep state to the active state, and transitions the memory 124 from the active state to the sleep state. Additionally, the control circuitry 160 powers up the memory interface 132, and powers down the memory interface 122. These steps continue as the refresh operations continue for the display device.

In another implementation, the video frame that includes the portions "1" to "16" is the last frame that is rendered before the integrated circuit 300 enters the idle state. In such a case, the memory interfaces 112, 122, 132 and 142 transfer data between the memories 114, 124, 134 and 144 to store the portions "1" to "16" in a contiguous manner. Afterward, the control circuitry 160 transitions each of the memories 124, 134 and 144 to the sleep state while maintaining the memory 114 in the active state. Additionally, the control circuitry 160 powers down the memory interfaces 122, 132 and 142, or turns off a corresponding power supply reference level to the memory interfaces 122, 132 and 142.

The memory interface 112 remains connected to a corresponding power supply reference level, and remains operable in an active state along with the memory 114. Subsequently, the integrated circuit 300 performs the steps of the refresh operation as described earlier.

Figure 4:
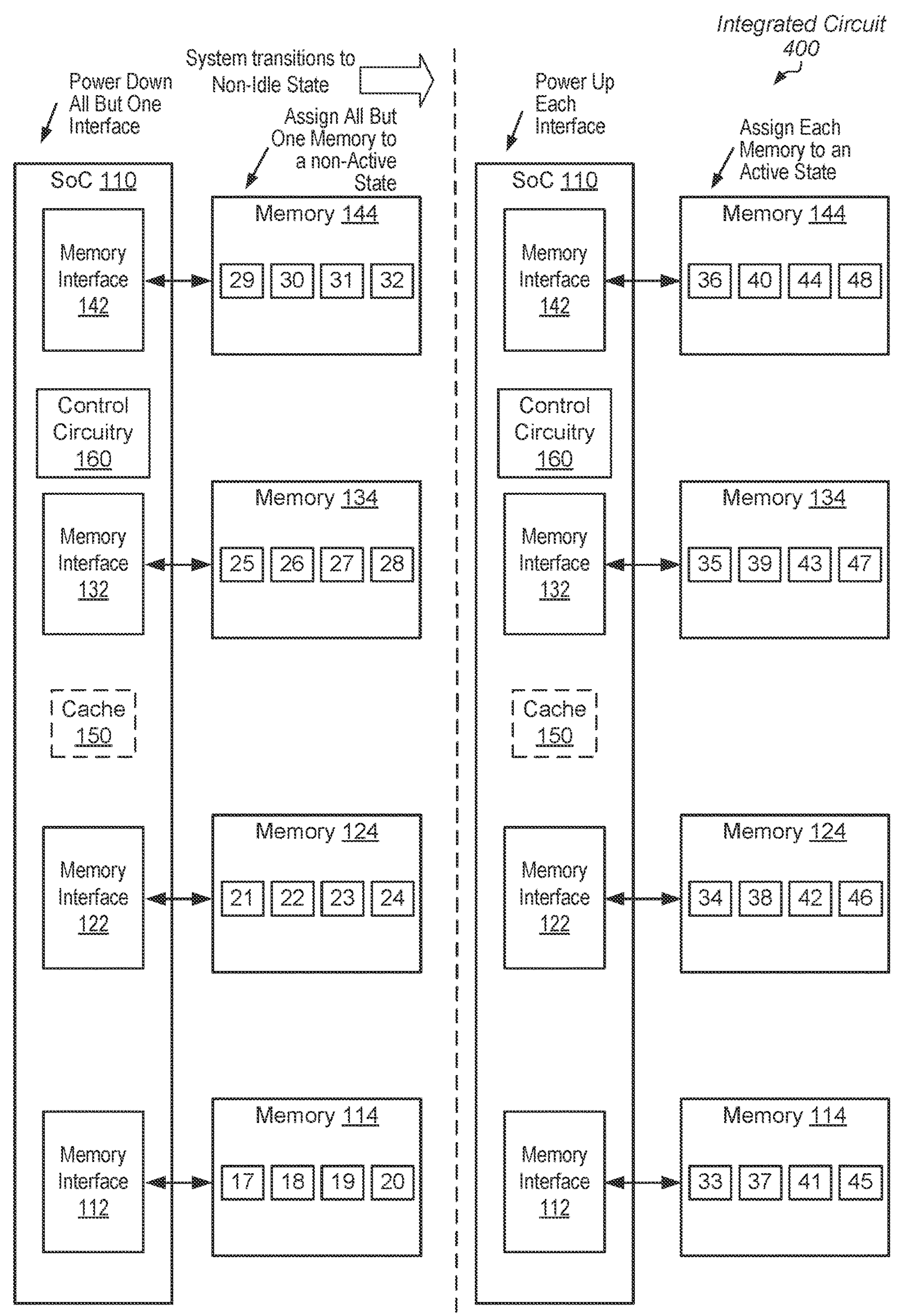
FIG. 4 is a generalized block diagram of an integrated circuit that manages power consumption among replicated memories.

Referring to FIG. 4, a generalized block diagram is shown of an integrated circuit 400 that manages power consumption among replicated memories. Circuits and signals described earlier are numbered identically. Here, each of the memories 114, 124, 134 and 144 store a corresponding copy of the portions "17" to "32" in a contiguous manner as shown earlier. The control circuitry 160 determines the integrated circuit 400 exits an idle state. For example, a video graphics workload ends the idle state indicating a static screen of the display device, and resumes rendering video frame data for the display device. The control circuitry 160 assigns each of the memories 114, 124, 134 and 144 an active state such that no memory of the memories 114, 124, 134 and 144 is still in a sleep state. In addition, the control circuitry 160 ensures no memory interface of the memory interfaces 112, 122, 132 and 142 remains turned off or disconnected from a corresponding power supply reference level. Rather, each of the memory interfaces 112, 122, 132 and 142 is turned on and in an active state. When new data of the given type is retrieved from the DMA engine or other unit, and sent to the integrated circuit 400, the new data of the given type continues to be stored in an interleaved manner in the memories 114, 124, 134 and 144. Therefore, the latency of accesses in the non-idle state is reduced.

Figure 5:
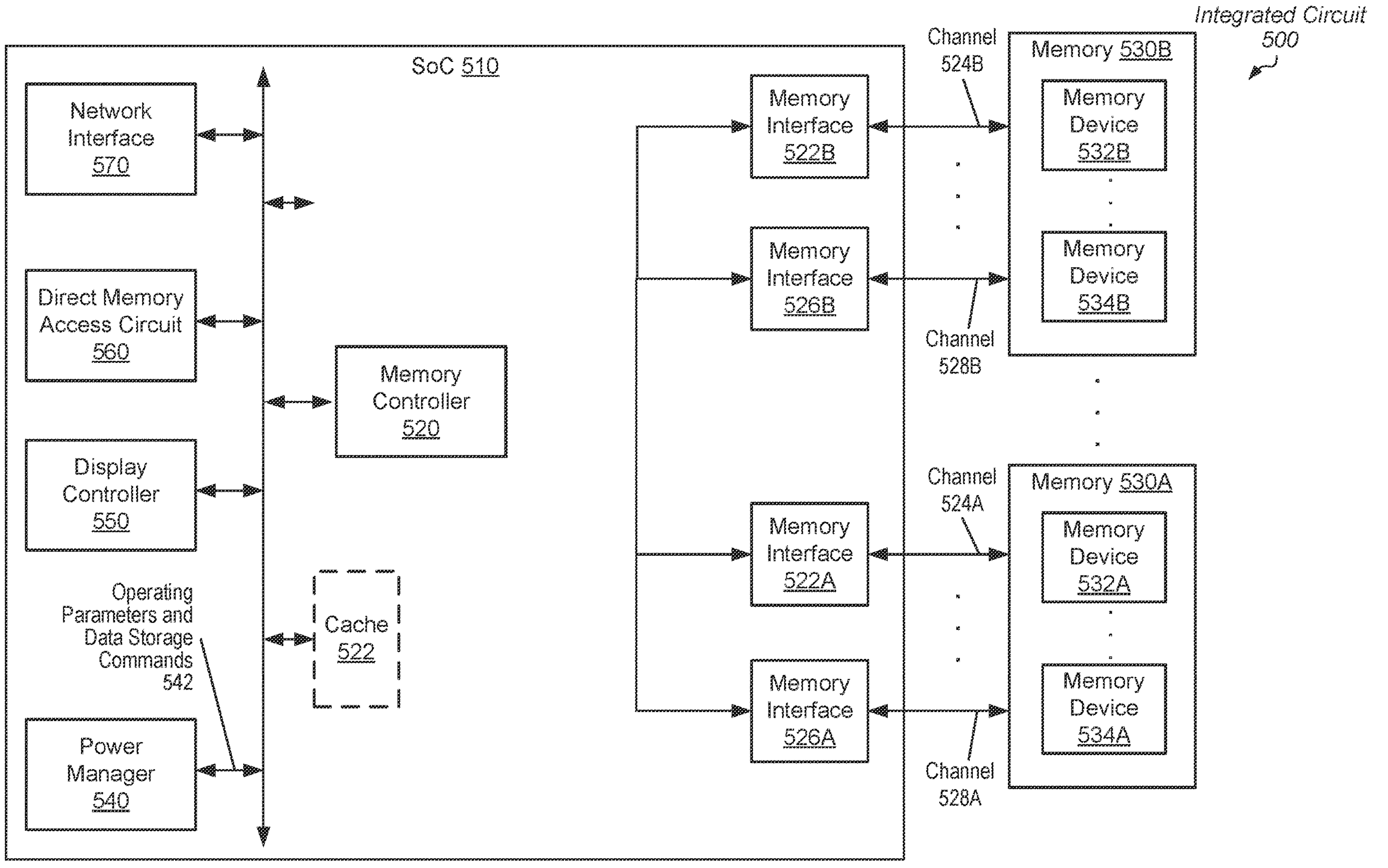
FIG. 5 is a generalized block diagram of an integrated circuit that manages power consumption among replicated memories.

Referring to FIG. 5, a generalized block diagram is shown of an apparatus 500 that manages power consumption among replicated memories of an integrated circuit. In the illustrated implementation, the apparatus 500 includes the SoC 510 and the memories 530A-530B. The SoC 510 includes the memory controller 520, the memory interfaces 522A and 526A to transfer data with the local memory 530A via the communication channels 524A and 528A, and the memory interfaces 522B and 526B to transfer data with the local memory 530B via the communication channels 524B and 528B. The SoC 510 also includes the power manager 540, the display controller 550, the direct memory access (DMA) circuit 560 (or DMA engine 560), and the network interface 570.

In various implementations, the SoC 510 also includes one or more functional blocks (not shown) for processing a variety of types of tasks. Examples of the functional blocks are a central processing unit (CPU), an application specific integrated circuit (ASIC), a field programmable gate array (FPGA), a multimedia engine, and a processing unit with a highly parallel microarchitecture such as a graphics processing unit (GPU) and a digital signa processor (DSP). In some implementations, one or more of these functional blocks render video frame data that is later sent to the display controller 550. Other components of the apparatus 500 are not shown for ease of illustration. For example, an off-chip memory controller, one or more input/output (I/O) interface units, interrupt controllers, one or more phased locked loops (PLLs) or other clock generating circuitry, and a variety of other functional blocks are not shown although they can be used by the apparatus 500. In various implementations, the apparatus 500 is used in a desktop, a portable computer, a mobile device, a server, a peripheral device, or other.

Although only two memories 530A-530B are shown, other numbers of memories used by apparatus 500 are possible and contemplated and the number is based on design requirements. In an implementation, the optional cache 522 is a last-level cache of a cache memory subsystem hierarchy. However, due to limited on-die area of the SoC 510, the size of the cache 522 is also limited. The memory controller 520 uses the local memory controllers 522A and 526A to transfer data with the local memory 530A via the communication channels 524A and 528A. The local memory 530A includes the memory devices 532A and 534A. In some implementations, each of the memory devices 532A and 534A is one of a variety of types of synchronous dynamic random-access memory (SDRAM) specifically designed for applications requiring both high memory data bandwidth and high memory data rates. In other implementations, each of the memory devices 532A and 534A is another type of DRAM.

In various implementations, each of the communication channels 524A and 528A is a point-to-point (P2P) communication channel. A point-to-point communication channel is a dedicated communication channel between a single source and a single destination. Therefore, the point-to-point communication channel transfers data only between the single source and the single destination. The address information, command information, response data, payload data, header information, and other types of information are transferred on metal traces or wires that are accessible by only the single source and the single destination. In an implementation, the local memory controllers 522A and 526A support one of a variety of types of a Graphics Double Data Rate (GDDR) communication protocol.

It is noted that although the communication channels 524A and 528A use the term "communication channel," each of the communication channels 524A and 528A is capable of transferring data across multiple memory channels supported by a corresponding memory device. For example, a single memory channel of a particular memory device can include 60 or more individual signals with 32 of the signals dedicated for the response data or payload data. A memory controller or interface of the memory device can support multiple memory channels. Each of these memory channels is included within any of the communication channels 524A and 528A.

The components of the SoC 510 communicate with one another through one or more of a communication bus, a point-to-point channel, a communication fabric, or other are used to transfer data and commands. The network interface 570 supports a communication protocol for communication with one of a variety of types of a network. The DMA circuit 560 supports memory mapping and a communication protocol used to communicate with one of a variety of types of system memory. The display controller 550 receives rendered video frame data from the memories 530A-530B and prepares this data to present an image on a corresponding display device. Each of the memory devices 532A-532B and 534A-534B is assigned a respective power domain by the power manager 540.

The power domain includes at least operating parameters such as at least an operating power supply voltage and an operating clock frequency. Each of the power domains also includes control signals for enabling and disabling connections to clock generating circuitry and a power supply reference.

In some implementations, the hardware, such as circuitry, of the power manager 540 determines when tasks of a workload enter an idle state. In other implementations, the power manager 540 receives an indication of the idle state. The idle state can indicate a static screen of the display device connected to the display controller 550. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system enters an idle state although the video graphics application has not stopped being executed. The power manager 540 sends operating parameters and data storage commands 542 to one or more of the DMA circuit 560 and the memory controller 520. For example, the power manager 540 includes the functionality of the control circuitry 160 of integrated circuits 100-400 (of FIGS. 1-4). In another implementation, other circuitry other than the power manager 540 includes this functionality.

Figure 6:
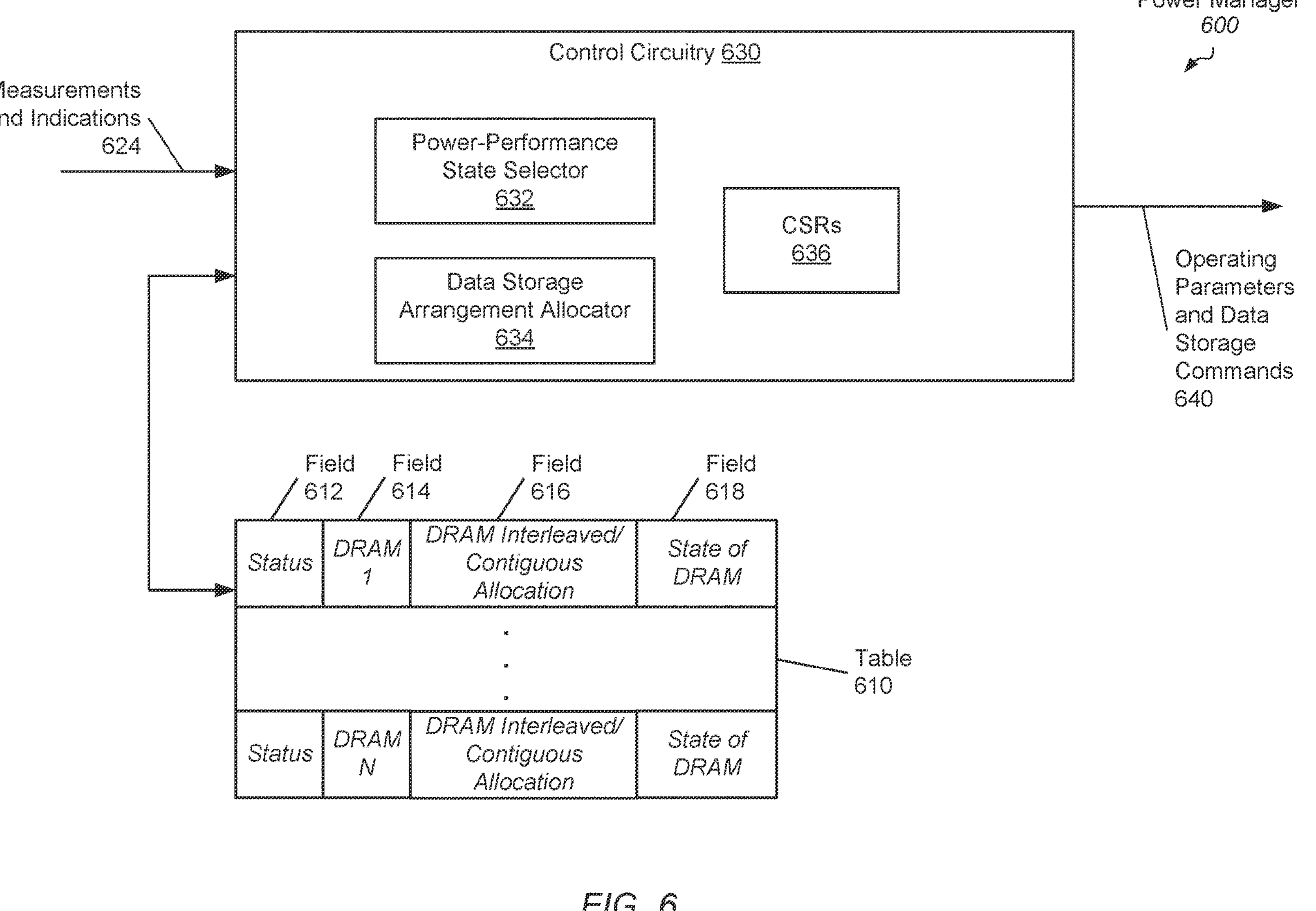
FIG. 6 is a generalized block diagram of a power manager that manages power consumption among replicated memories of an integrated circuit.

Turning now to FIG. 6, a generalized block diagram is shown of a power manager 600 that manages power consumption among replicated memories of an integrated circuit. In various implementations, the power manager 600 includes the functionality of the control circuitry 160 of integrated circuits 100-400 (of FIGS. 1-4). As shown, the power manager 600 includes the table 610 and the control circuitry 630. The control circuitry 630 includes multiple components 632-636 that are used to generate the operating parameters and data storage commands 640 to update power domains of multiple memories. The table 610 includes multiple table entries (or entries), each storing information in multiple fields such as at least fields 612-618. The table 610 is implemented with one of flip-flop circuits, a random-access memory (RAM), a content addressable memory (CAM), or other. Although particular information is shown as being stored in the fields 612-618 and in a particular contiguous order, in other implementations, a different order is used and a different number and type of information is stored. As shown, field 612 stores status information such as at least a valid bit. Field 614 stores an identifier that specifies one of the multiple memories such as a DRAM.

Field 616 stores a value indicating whether a memory of the corresponding memory, such as DRAM used as local memory, is storing data of the given type in a contiguous manner or an interleaved manner. Field 618 stores a current value indicating the most-recent P-state or power domain for the corresponding memory. The control circuitry 630 receives usage measurements and indications 624, which represent activity levels of the memories and power consumption measurements or parameters used to determine recent power consumption values of the memories. The power-performance state (P-state) selector 632 selects the next operating parameters to use for the memories and corresponding memory interfaces. The data storage arrangement allocator 634 (or allocator 634) includes circuitry that determines whether the memories store data of the given type in a contiguous manner or an interleaved manner.

In some implementations, the data of the given type is video frame data. Based on one or more of the expected size of the video frame data, expected performance degradation when accessing data in a contiguous manner from the memories, any quality of service (QOS) values associated with the video graphics application, values stored in the table 610, and so on, the allocator 634 determines whether the caches and the memories store data of the given type in a contiguous manner or an interleaved manner. One or more components of the power manager 600 use values stored in the configuration and status registers (CSRs) 636. The CSRs 636 store the above examples of values used by the allocator 634. In some implementations, one or more of the components of power manager 600 and corresponding functionality is provided in another external circuit, rather than provided here in power manager 600.

Figure 7:
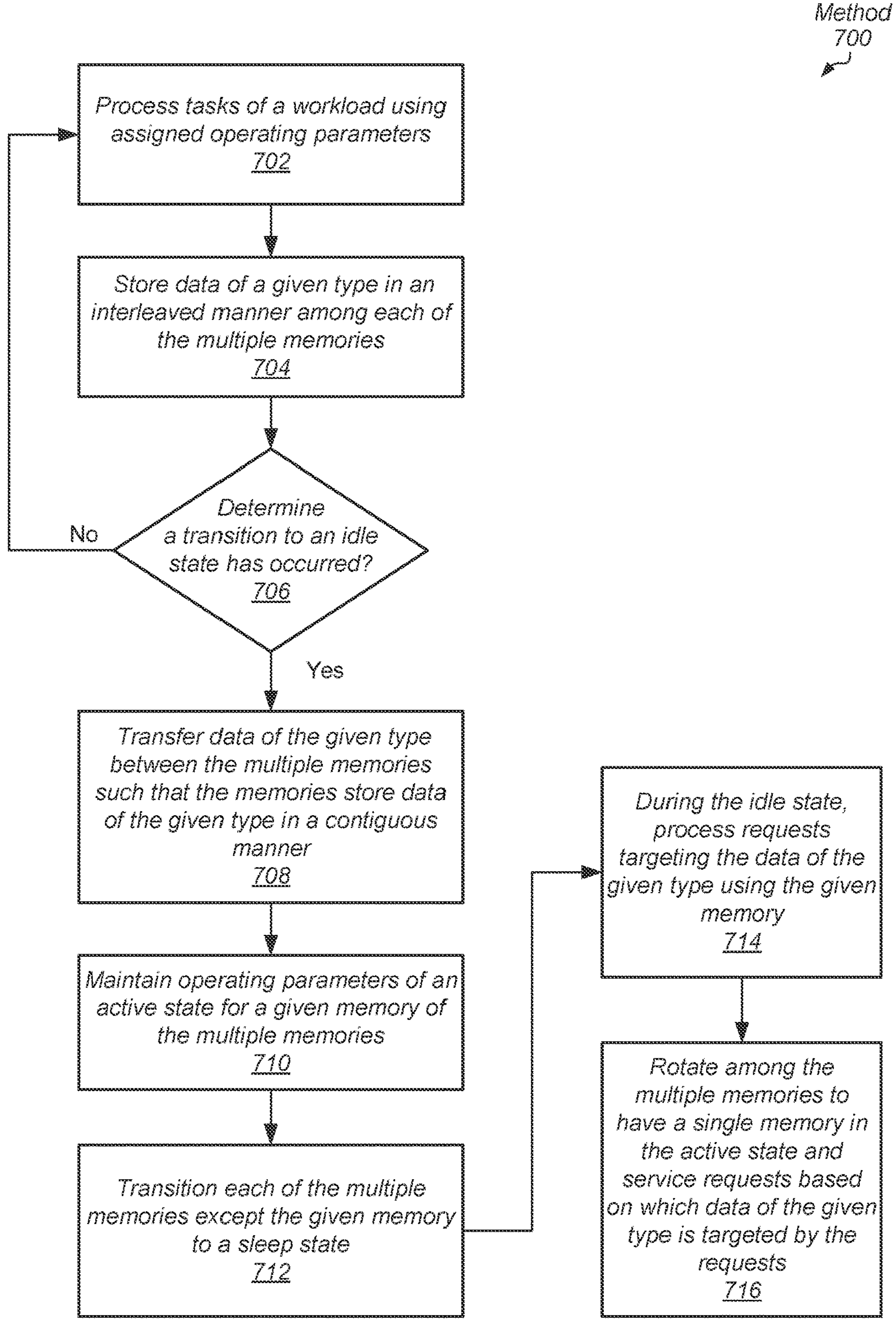
FIG. 7 is a generalized diagram of a method for efficiently managing power consumption among replicated memories of an integrated circuit.

Referring to FIG. 7, a generalized block diagram is shown of a method 700 for efficiently managing power consumption among replicated memories of an integrated circuit. For purposes of discussion, the steps in this implementation (as well as in FIG. 8) are shown in sequential order. However, in other implementations some steps occur in a different order than shown, some steps are performed concurrently, some steps are combined with other steps, and some steps are absent.

Hardware, such as circuitry, of multiple memories of an integrated circuit process tasks of a workload using assigned operating parameters (block 702). In various implementations, the multiple memories include a memory device such as one of a variety of types of DRAM. In various implementations, a power manager assigns a respective power domain to each of multiple memories of an integrated circuit. Each of the power domains includes at least operating parameters such as at least an operating power supply voltage and an operating clock frequency. Each of the power domains also includes control signals for enabling and disabling connections to clock generating circuitry and a power supply reference. In an implementation, the integrated circuit processes tasks of a video graphics workload such as rendering video frame data for a display device. The data of a given type is video frame data of a frame buffer that has been rendered. This data of the given type is sent from the multiple memories to a display device.

The multiple memories store data of the given type in an interleaved manner (block 704). In some implementations, the power manager or other control circuitry determines when tasks of a workload cause the integrated circuit to transition to an idle state. In other implementations, the power manager or other control circuitry receives an indication of the idle state. The idle state can indicate a static screen of the display device. For example, a video graphics application no longer updates frame data to be viewed on the display device. It is possible that the video graphics application is paused or is waiting for further user input, and during the wait time, the scene or picture is not updated on the display device. Therefore, the video processing subsystem of the computing system that includes the multiple memories enters an idle state although the video graphics application has not stopped being executed.

If the control circuitry determines a transition to the idle state has not yet occurred ("no" branch of the conditional branch 706), then control flow of method 700 returns to block 702 where the integrated circuit processes tasks of the workload using assigned operating parameters. However, if the control circuitry determines a transition to idle state has occurred ("yes" branch of the conditional branch 706), then the control circuitry sends commands to the multiple memories to transfer data of the given type between the memories until data of the given type is stored in a contiguous manner in the memories (block 708). In another implementation, the control circuitry sends commands to the multiple memories to store new data in a contiguous manner.

The control circuitry sends commands or indications to the memories specifying maintaining operating parameters of an active state for a given memory of the multiple memories (block 710). The control circuitry transitions each of the multiple memories except the given memory to a sleep state (block 712). Additionally, in some implementations, the control circuitry powers down the memory interfaces corresponding to each of the multiple memories except the given memory. For example, in an implementation, the control circuitry removes a corresponding power supply reference level for each of the multiple memories except the given memory. During the idle state, the memories process requests targeting the data of the given type using the given memory (block 714). The control circuitry rotates among the multiple memories to have a single memory in the active state and service requests based on which data of the given type is targeted by the requests (block 716). In an implementation, the control circuitry powers on only a single memory interface that is associated with the single memory in the active state. The other memory interfaces are powered down.

Figure 8:
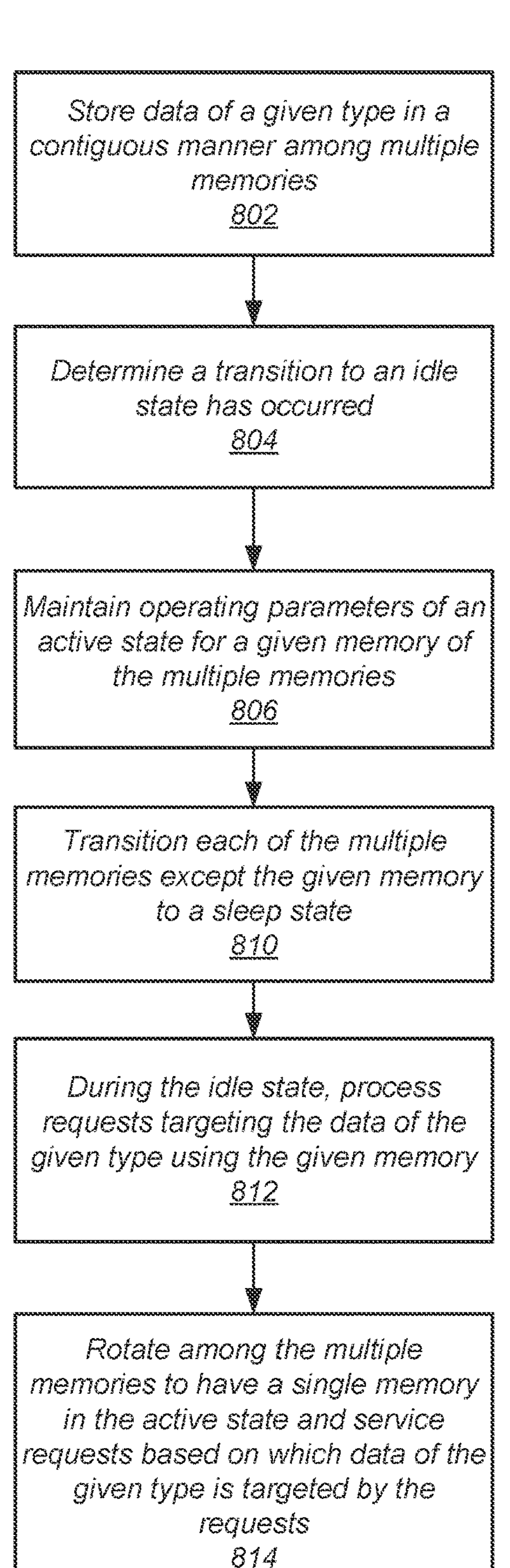
FIG. 8 is a generalized diagram of a method for efficiently managing power consumption among replicated memories of an integrated circuit.

Turning now to FIG. 8, a generalized block diagram is shown of a method 800 for efficiently managing power consumption among replicated memories of an integrated circuit. Control circuitry sends commands or indications to memories specifying storing data of a given type in a contiguous manner among multiple memories (block 802). The control circuitry determines a transition to an idle state has occurred (block 804). The control circuitry sends commands or indications to the memories specifying maintaining operating parameters of an active state for a given memory of the multiple memories (block 808). The control circuitry transitions each of the multiple memories except the given memory to a sleep state (block 810). Additionally, in some implementations, the control circuitry powers down the memory interfaces corresponding to each of the multiple memories except the given memory. For example, in an implementation, the control circuitry removes a corresponding power supply reference level for each of the multiple memories except the given memory. During the idle state, the memories process requests targeting the data of the given type using the given memory (block 812). The control circuitry rotates among the multiple memories to have a single memory in the active state and service requests based on which data of the given type is targeted by the requests (block 814). In an implementation, the control circuitry powers on only a single memory interface that is associated with the single memory in the active state. The other memory interfaces are powered down.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
control circuitry; and
wherein responsive to an idle state of the integrated circuit, the control circuitry is configured to:
cause data interleaved across a plurality of memories to be reorganized by changing a storage location of at least a portion of the data, such that the data remains stored in the plurality of memories;
cause a first memory of the plurality of memories to be, or remain in, an active state;
cause a second memory of the plurality of memories to enter a reduced power state while retaining one or more portions of the data;
service a first request targeting the data by accessing the first memory.

2. The integrated circuit as recited in claim 1, wherein the control circuitry is further configured to:
cause the first memory to enter a reduced power state;
cause the second memory to enter an active state; and
service a second request targeting the data by accessing the second memory.

3. The integrated circuit as recited in claim 1, wherein the control circuitry is further configured to select the first memory to service the first request based on a determination that the first memory stores a portion of the data targeted by the first request while the second memory is in the reduced power state.

4. The integrated circuit as recited in claim 1, wherein the data includes rendered display data retained in the plurality of memories during the idle state.

5. The integrated circuit as recited in claim 1, wherein, responsive to an end of the idle state, the control circuitry is configured to cause the data to be interleaved across the plurality of memories.

6. The integrated circuit as recited in claim 1, wherein the data is video frame data stored in a frame buffer.

7. The integrated circuit as recited in claim 1, wherein the idle state corresponds to a display device.

8. A method comprising:
processing tasks by an integrated circuit;
responsive to an idle state of the integrated circuit:
causing, by control circuitry, data interleaved across a plurality of memories to be reorganized by changing a storage location of at least a portion of the data, such that the data remains stored in the plurality of memories;
causing a first memory of the plurality of memories to be, or remain in, an active state;
causing a second memory of the plurality of memories to enter a reduced power state while retaining one or more portions of the data;
servicing, by the control circuitry, a first request targeting the data by accessing the first memory.

9. The method as recited in claim 8, further comprising:
causing the first memory to enter a reduced power state;
causing the second memory to enter an active state; and
servicing a second request targeting the data by accessing the second memory.

10. The method as recited in claim 8, further comprising sending, by the control circuitry, an indication to the plurality of memories to cause the portion of the data stored as interleaved data using the plurality of memories to be reorganized.

11. The method as recited in claim 8, wherein the data includes rendered data for a last frame processed before the idle state of the integrated circuit.

12. The method as recited in claim 8, further comprising causing the data to be interleaved across the plurality of memories, responsive to an end of the idle state.

13. The method as recited in claim 8, wherein the data is video frame data stored in a frame buffer.

14. The method as recited in claim 8, wherein the idle state corresponds to a display device.

15. A computing system comprising:

a plurality of memories, each memory configured to store data to be processed by the one or more tasks;

an integrated circuit configured to execute instructions using the data, wherein the integrated circuit comprises:

control circuitry;

wherein responsive to an idle state of the integrated circuit, the control circuitry is configured to:

cause data interleaved across the plurality of memories to be reorganized by changing a storage location of at least a portion of the data, such that the data remains stored in the plurality of memories;

cause a first memory of the plurality of memories to be, or remain in, an active state;

cause a second memory of the plurality of memories to enter a reduced power state while retaining one or more portions of the data;

service a first request targeting the data by accessing the first memory.

16. The computing system as recited in claim 15, wherein the control circuitry is further configured to:

cause the first memory to enter a reduced power state;

cause the second memory to enter an active state; and service a second request targeting the data by accessing the second memory.

17. The computing system as recited in claim 16, wherein the control circuitry is further configured to select the first memory to service the first request based on a determination that the first memory stores a portion of the data targeted by the first request while the second memory is in the reduced power state.

18. The computing system as recited in claim 15, wherein the stored data includes a subset of rendered data for a last frame processed before the integrated circuit transits into the idle state.

19. The computing system as recited in claim 15, wherein, responsive to an end of the idle state, the control circuitry is further configured to send an indication to the plurality of memories to cause the stored data to be rearranged between the plurality of memories as interleaved data.

20. The computing system as recited in claim 15, wherein the data is video frame data stored in a frame buffer.

* * * * *